(12) United States Patent
Widdis et al.

(10) Patent No.: US 11,804,759 B1
(45) Date of Patent: Oct. 31, 2023

(54) MOTOR WITH A FULLY WELDED ROTOR FOR AN ELECTRIC AIRCRAFT AND A METHOD FOR MANUFACTURING

(71) Applicant: BETA AIR, LLC, South Burlington, VT (US)

(72) Inventors: Stephen Widdis, South Burlington, VT (US); Manon Belzile, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/966,816

(22) Filed: Oct. 15, 2022

(51) Int. Cl.
*H02K 1/28* (2006.01)
*H02K 15/03* (2006.01)
*H02K 1/2706* (2022.01)

(52) U.S. Cl.
CPC .......... *H02K 15/03* (2013.01); *H02K 1/2706* (2013.01); *H02K 1/28* (2013.01); *H02K 2215/00* (2021.08)

(58) Field of Classification Search
CPC ........ H02K 15/03; H02K 1/2706; H02K 1/28; H02K 2215/00; H02K 1/30
See application file for complete search history.

(56) References Cited

U.S. PATENT DOCUMENTS

| | | | |
|---|---|---|---|
| 8,344,577 B2 | 1/2013 | Osborne | |
| 8,533,948 B2 | 9/2013 | Keller | |
| 8,662,851 B2 | 3/2014 | Izadi | |
| 2008/0245127 A1* | 10/2008 | Staffend | F01C 21/106 72/370.23 |
| 2015/0028709 A1* | 1/2015 | Ueda | H02K 1/278 310/156.19 |
| 2017/0040870 A1* | 2/2017 | Ballauf | H02K 1/12 |
| 2018/0233975 A1* | 8/2018 | Shimomura | B60K 6/28 |
| 2019/0267885 A1* | 8/2019 | Frank | H02K 55/04 |

* cited by examiner

*Primary Examiner* — Thomas Truong
(74) *Attorney, Agent, or Firm* — CALDWELL INTELLECTUAL PROPERTY LAW

(57) ABSTRACT

In an aspect of the present disclosure is an electric aircraft motor with a fully welded rotor. The motor includes a stator and a rotor. The stator includes an inner cylindrical surface and an outer cylindrical surface. The rotor includes a cylindrical portion and spokes welded to the cylindrical portion. In another aspect of the present disclosure is a method for manufacturing a fully welded rotor.

20 Claims, 6 Drawing Sheets

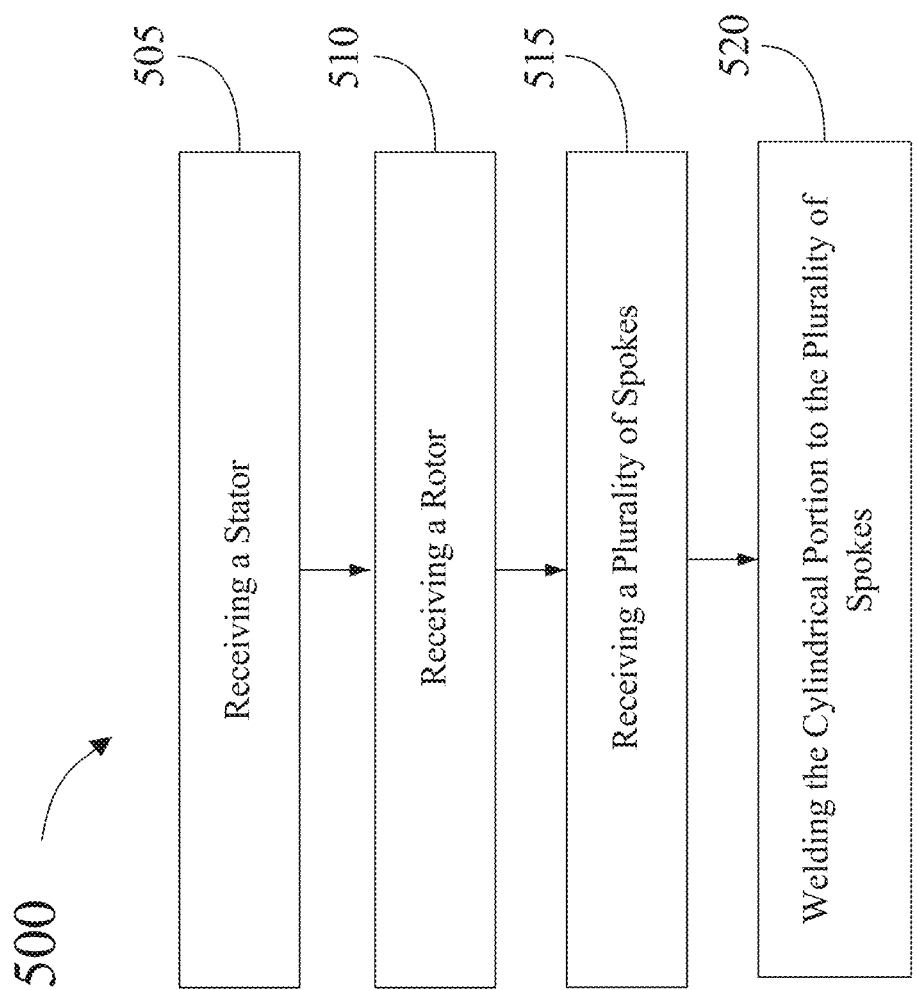

US 11,804,759 B1

MOTOR WITH A FULLY WELDED ROTOR FOR AN ELECTRIC AIRCRAFT AND A METHOD FOR MANUFACTURING

FIELD OF THE INVENTION

The present invention generally relates to the field of motors for electric aircraft. In particular, the present invention is directed to a motor with a fully welded rotor for an electric aircraft and a method for manufacturing.

BACKGROUND

Development in electric aircraft provides new opportunities for various forms of flight. Electric motors are very expensive to manufacture due to the cost of materials and the subtractive nature of manufacturing.

SUMMARY OF THE DISCLOSURE

In an aspect, a motor with a fully welded rotor for an electric aircraft includes a stator connected to the electric aircraft, the stator comprising: an inner cylindrical surface and an outer cylindrical surface, wherein each of the inner cylindrical surface and the outer cylindrical surface is coaxial about an axis of rotation, and a rotor coaxial within the stator, the rotor comprising: a cylindrical portion, and spokes welded to the cylindrical portion.

In another aspect, a method of manufacturing a fully welded rotor includes receiving a cylindrical portion of a rotor, wherein the rotor is coaxial within a stator receiving spokes, and welding the cylindrical portion to the spokes.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a flow diagram of a method of manufacturing a fully welded rotor.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed an electric aircraft motor with a fully welded rotor.

In an embodiment, rotors are often expensive to manufacture as much of the material is lost due to subtractive manufacturing. A fully welded rotor may be cheaper to manufacture and use as less material is lost due to subtractive manufacturing. The pieces of the rotor may be joined together using welding.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", "inner", "outer", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
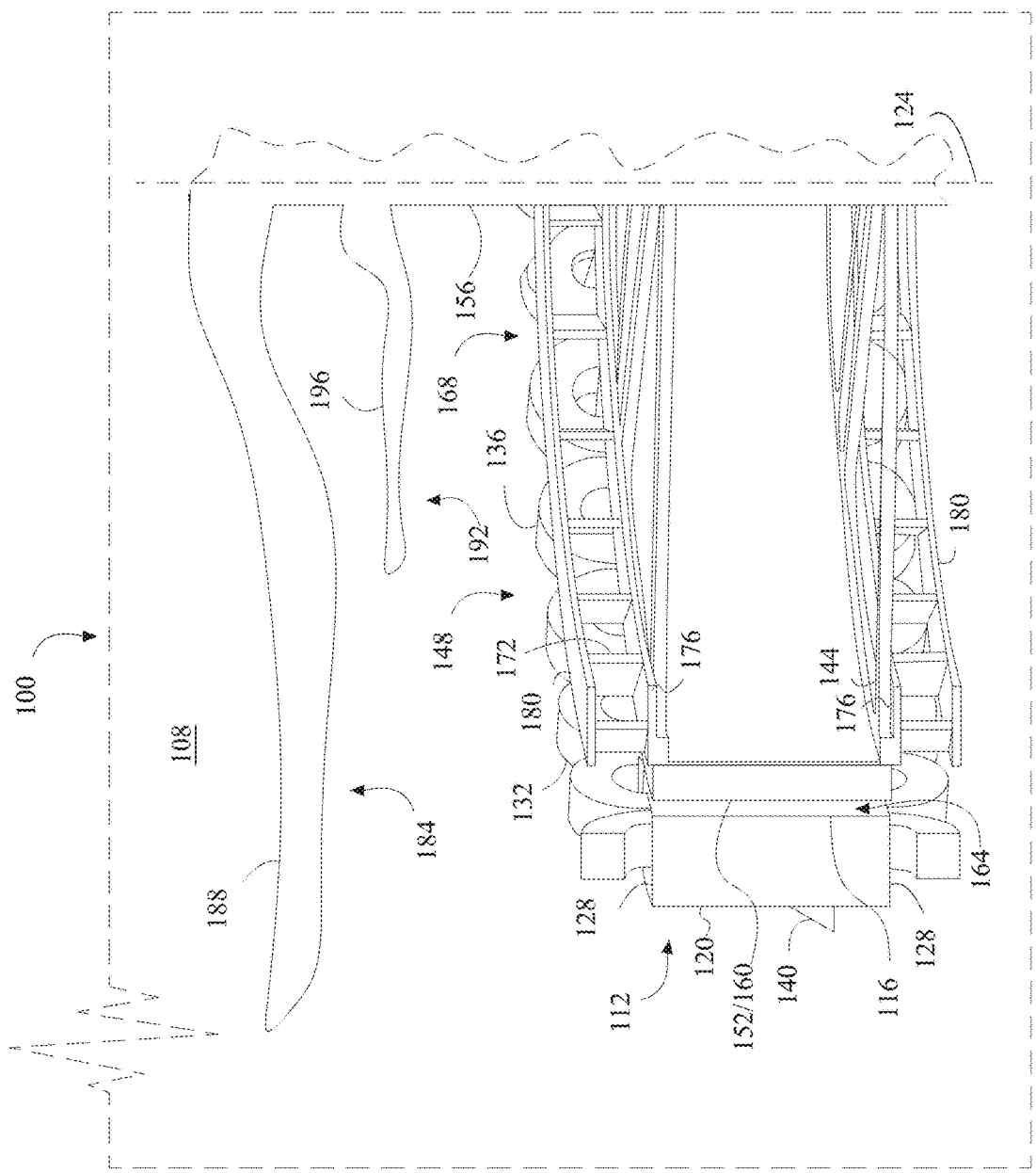
FIG. 1 is a sectional view of an exemplary embodiment of a motor on an electric aircraft according to the present disclosure.

Referring now to the drawings, FIG. 1 illustrates an electric motor 100. Motor 100 includes a stator 112 connected to electric aircraft 108. Stator 112 includes an inner cylindrical surface 116 and an outer cylindrical surface 120 each coaxial about an axis of rotation 124 and at least partially defined by an axial edge 128 on either side. Stator 112 may comprise stacked laminations, also known as punchings, with inner teeth. An outer surface of the stacked laminations may form outer cylindrical surface 120. Inner cylindrical surface 116 and outer cylindrical surface 120 may share a coincident and parallel centerline disposed at the center of each cylindrical surface. Inner cylindrical surface 116 and outer cylindrical surface 120 may include different radii and thus include different sizes. Stator 112 may include windings 132 made of electrically conductive coil wound around a magnetic core, which may include without limitation an iron core or other magnetic material. Specifically, windings 132 may be wound around the inner teeth of the stacked laminations. Coil may include any material that is conductive to electrical current and may include, as a non-limiting example, various metals such as copper, steel, or aluminum, carbon conducting materials, or any other suitable conductive material. Each of windings 132 may form an oval shape with an end turn 136 on either end of windings 132. End turn 136 may extend past at least an axial edge 128 of stator 112. Each end turn 136 may extend past the corresponding at least an axial edge 128 such that a portion of an interior space of each of windings 132 at least partially extends past both at least an axial edge 128. Stator 112 may include one or more magnets which may be assembled in rows along a structural casing component. Further, stator 112 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding.

With continued reference to FIG. 1, outer cylindrical surface 120 of stator 112 may include at least a cooling fin 140 as a heat exchanger to draw heat from stator 112. At least a cooling fin 140 may include a plurality of cooling fins, which may be evenly distributed radially on outer cylindrical surface 120. At least a cooling fin 140 may be made from any thermally conductive material known in the art including, without limitation, copper, nickel, aluminum, stainless steel, and/or any combination thereof. At least a cooling fin 140 may be attached to outer cylindrical surface 120 and may extend radially from the outer cylindrical surface 120. At least a cooling fin 140 may include a flat surface, a wavy surface, and/or ridges. Any shape may be suitable for at least a cooling fin 140. At least a cooling fin 140 may include a plurality of cooling fins.

Still referring to FIG. 1, motor 100 includes a rotor 148 coaxial within stator 112. A rotor 148 is a portion of an electric motor that rotates with respect to a stator 112 of the electric motor, such as stator 112. Rotor 148 includes a cylindrical portion 152, wherein the cylindrical portion 152 and inner cylindrical surface 116 of stator 112 combine to form an air gap 164 between the cylindrical portion 152 and the inner cylindrical surface 116. Cylindrical portion 152 may be disposed opposite and opposing to inner cylindrical surface 116 of stator 112. Rotor 148 may include a rotor shaft 156. Rotor shaft 156 may be disposed coaxially and coincidentally within stator 112. Rotor shaft 156 may be rotatable relative to stator 112, which remains stationary relative to electric aircraft 108. Cylindrical portion 152 may be radially spaced from rotor shaft 156 such as, for example, in a squirrel cage rotor assembly. At least a spoke 144 may extend from rotor shaft 156 to one or both of axial edge 128 of cylindrical portion 152. At least a spoke 144 may include a plurality of spokes on each of axial edge 128 of cylindrical portion 152. Rotor 148 may include a plurality of permanent magnets, namely a magnet array 160, disposed radially about the axis of rotation 124 of rotor shaft 156 which may be parallel and coincident with axis of rotation 124 of motor 100. Magnet array 160 may be positioned on cylindrical portion 152 and radially from rotor shaft 156, such that cylindrical portion 152 is between magnet array 160 and rotor shaft 156. Magnet array 160 may be opposite inner cylindrical surface 116 of stator 112 and spaced from the inner cylindrical surface 116 by air gap 164. Cylindrical portion 152 may comprise magnet array 160. Magnet array 160 may include a Halbach array. A Halbach array is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the rotor shaft 156, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable. Magnet array 160 may comprise a magnet sleeve forming at least part of cylindrical portion 152 with slits and/or ribs in the magnet sleeve to further dissipate heat. Slits and/or ribs may be unidirectional. Slits and/or ribs may be bidirectional on magnet array 160 such as, for example, in a chevron pattern.

With continued reference to FIG. 1, an axial fan 168 is connected to an axial end of rotor 148 and configured to rotate with rotor 148. As used in this disclosure, an "axial end" is an end along an axis of rotation of a body. Axial fan 168 may be a centrifugal fan. As used in this disclosure, a "centrifugal fan" is a mechanical device for moving air in a direction at an angle to the incoming air. For example, a centrifugal fan may direct air radially in a direction substantially perpendicular to the incoming air. Axial fan 168 includes at least a blade 172 configured to direct air toward air gap 164. In some embodiments, axial fan 168 may be configured to direct air across air gap 164. Directed air could be caused to circulate through air gap 164 due to the Venturi effect. At least a blade 172 may be configured to direct air radially away from axis of rotation 124. At least a blade 172 may be one or more straight radial blades each comprising a flat surface extending radially such that the flat surface is perpendicular to axis of rotation 124. According to the direction of rotation, the at least a blade 172 may slope outward toward inner cylindrical surface 116 of stator 112. At least a blade 172 may include a plurality of blades similarly positioned and spaced from each other so each of plurality of blades is angled outward toward inner cylindrical surface 116 of stator 112 to direct air toward stator 112. At least a blade 172 may be backward-curved blades that curve against the direction of the rotation of axial fan 168. At least a blade 172 may be forward-curved blades that curve in the direction of the rotation of axial fan 168. At least a blade 172 may be on one or more axials ends of rotor 148. As used in this disclosure, "on" may include directly on and indirectly attached to such that there are one or more intervening elements. Axial fan 168 may include a base platform 176 and a roof platform 180 wherein at least a blade 172 is secured between base platform 176 and roof platform 180. At least a blade 172 may be confined by base platform 176 and roof platform 180. Each of axial end may include an axial edge. Base platform 176 and roof platform 180 may each be substantially parallel to one of axial edge 128 of stator 112. Thus, base platform 176 may be substantially parallel to roof platform 180. Base platform 176 may be attached to an axial edge of rotor 148. Base platform 176 and/or roof platform 180 may extend radially toward rotor shaft 156 and/or toward stator 112. Base platform 176 may rest on one or more of at least a spoke 144. At least a blade 172 may be substantially perpendicular to base platform 176 and roof platform 180. At least a blade 172 is configured to direct air toward air gap 164 between stator 112 and rotor 148. In some embodiments, at least a blade 172 may not be perpendicular to base platform 176 and roof platform 180. In some embodiments, at least a blade 172 may be configured to direct air toward an end turn 136 of windings 132. At least a blade 172 may be configured to direct air through at least part of interior space of windings 132. At least a blade 172 may include a blade on either axial end of rotor 148. For example, axial fan 168 may include base platform 176, at least a blade 172, and roof platform 180 on both axial ends of rotor 148 such that one of base platform 176 is attached to one of the axial ends and another of base platform 176 is attached to the opposite axial end of rotor 148. At least a blade 172 on one axial end of rotor 148 may correspond to at least a blade 172 on the opposite axial end of rotor 148 such that each of at least a blade 172 is coplanar with another of at least a blade 172 on the opposite axial end.

Still referring to FIG. 1, an end of rotor shaft 156 may be attached to a propulsor 184. A "propulsor", as used herein, is a component or device used to propel a craft by exerting force on a fluid medium, which may include a gaseous medium such as air or a liquid medium such as water. Propulsor 184 may be any device or component that consumes electrical power on demand to propel an aircraft or other vehicle while on ground and/or in flight. Propulsor 184 may include one or more propulsive devices. In an embodiment, propulsor 184 can include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 184 may include at least a propulsor blade 188. At least a propulsor blade 188 may include a plurality of propulsor blades. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 184. In an embodiment, when a propulsor twists and pulls air behind it, it will, at the same time, push the aircraft forward with an equal amount of force. The more air pulled behind the aircraft, the more the aircraft is pushed forward. Thrust element may include a helicopter rotor incorporated into propulsor 184. A helicopter rotor, as used herein, may include one or more blade or wing elements driven in a rotary motion to drive fluid medium in a direction axial to the rotation of the blade or wing element. Its rotation is due to the interaction between the windings 132 and magnetic fields which produces a torque around the rotor's axis. A helicopter rotor may include a plurality of blade or wing elements.

Propulsor 184, including at least a propulsor blade 188, may be configured to prop wash along outer cylindrical surface 120 of stator 112. As used in this disclosure, "prop wash" is a disturbed mass of air pushed by and from a propulsor of an aircraft. Prop wash may be caused by sudden acceleration of propulsor. Prop wash may cause air turbulence in a helical pattern due to the rotation of the propulsor. At least a cooling fin 140, as discussed above, may be positioned on outer cylindrical surface 120 to receive prop wash. In some embodiments, at least a cooling fin 140 may be arranged to form one or more helical patterns on outer cylindrical surface 120.

Motor 100 may include a second fan 192 attached to rotor shaft 156. Second fan 192 may be positioned between propulsor 184 and rotor 148. Second fan 192 may have at least a secondary blade 196. At least a secondary blade 196 may include a plurality of blades. Second fan 192 may be a propeller fan with at least a secondary blade 196 extending substantially radially from a central hub at an angle to direct air flow. Second fan 192 may be configured to direct aid toward axial fan 168 and/or along outer cylindrical surface 120 of stator 112. Second fan 192 may be configured to direct air toward at least a cooling fan on outer cylindrical surface 120. Second fan 192 may be attached to propulsor 184. In some embodiments, second fan 192 may be spaced form propulsor 184. Second fan 192 may have a radius that is smaller than a radius of propulsor 184. For example, a distance from an end of at least a secondary blade 196 to axis of rotation 124 may be less than a distance from an end of at least a propulsor blade 188 to axis of rotation 124. Second fan 192 may have a radius that is smaller, equal to, or larger than a radius of cylindrical portion 152. Some or all of at least a secondary blade 196 may be aligned with some or all of at least a propulsor blade 188 such that an angular displacement between a plane containing axis of rotation 124 and some or all of the at least a secondary blade 196 is the same as the angular displacement between the plane and the corresponding some or all of the at least a propulsor blade 188. In some embodiments, some or all of at least a secondary blade 196 may not be aligned with some or all of at least a propulsor blade 188. At least a secondary blade 196 may extend perpendicular to axis of rotation 124. In some embodiments, at least a secondary blade 196 may extend toward rotor 148 such that the at least a secondary blade 196 and axis of rotation 124 form an acute angle relative to rotor 148. In other embodiments, at least a secondary blade 196 may extend away from rotor 148 such that the at least a secondary blade 196 and axis of rotation 124 form an obtuse angle relative to rotor 148.

Figure 2:
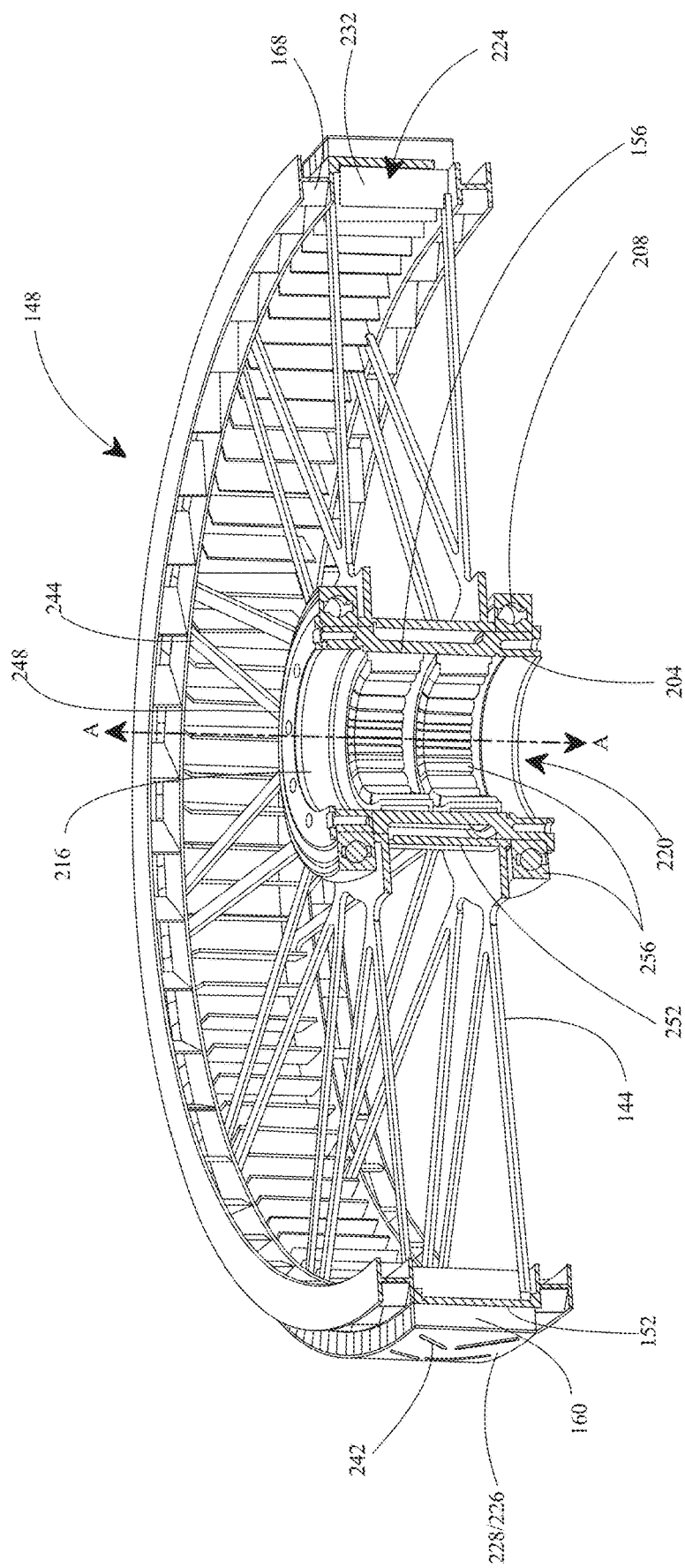
FIG. 2 is an embodiment of a rotor assembly used in an electric motor assembly.

Referring now to FIG. 2, cross-sectional views of an exemplary embodiment of a rotor 148 of a motor of an electric aircraft are shown in accordance with one or more embodiments of the present disclosure. In one or more embodiments, motor may include a lift motor of a propulsor, as discussed further in this disclosure in FIG. 1. In one or more embodiments, rotor 148 includes a hub 208. Hub 208 may be a tubular structure. As used herein, a "hub" is a component that holds the propulsor. In one or more embodiments, inner surface 216 may define a lumen 220. Lumen 220 may be a longitudinal cavity that receives a rotor shaft 156. Shaft 164 may be disposed within lumen 220 of hub 208 so that rotor 148 may rotate and simultaneously rotate shaft 164 which in turn rotates a propulsor. As used in this disclosure, a "lumen" is a central cavity, for example a tubular or cylindrical bore.

With continued reference to FIG. 2, and in one or more embodiments, hub 208 may comprise an inner hub 204 and an outer hub 252. In one or more embodiments, outer hub 252 may be attached to a proximal end 248 of spokes 144 of rotor 148, as discussed herein. In one or more embodiments, inner hub 204 may be secured to outer hub 252 using a locking mechanism. A locking mechanism may be configured to removably attach sprag 256 to hub 208. A locking mechanism may include a bolted joint, dowels, key, spline, and the like. In one or more embodiments, the inner hub may include a sprag clutch 256, as discussed in more detail below.

With continued reference to FIG. 2, and in one or more embodiments, rotor 148 includes a sprag 256. Sprag 256 may be disposed within inner hub 204. For example, and without limitation, sprag 256 may be attached to an inner surface 216 of inner hub 204. Sprag 256 may engage a rotor shaft (not shown) which allow for the rotational movement of rotor to be translated into a mechanical movement of, for example, a propulsor. Sprag 256 may include a sprag clutch. In one or more embodiments, sprag 256 may have a cage design, so that the sprags are less likely to lay down due to centrifugal force experienced when rotor is spinning. In one or more embodiments, sprag clutch 256 may include a maximum eccentricity of 90 microns.

With continued reference to FIG. 2, rotor 148 may include a cylindrical portion 152 concentrically positioned about hub 208. Cylindrical portion 152 may share a central axis A with hub 208. In one or more embodiments, cylindrical portion 152 may include magnets 112, which are position along an outer circumference of cylindrical portion 152 and attached to an outer surface of cylindrical portion 152. As used herein, a "magnet" is a material or object that produces a magnetic field. In one or more embodiments, a current may flow through a plurality of windings of a stator 112 (shown in FIG. 1) that then results in the generation of electrically-induced magnetic fields that interact with magnets 160 to rotate rotor 148 about central axis A. During operation, rotor 148 may rotate axially about central axis A while stator remains still; thus, rotor 148 is rotatable relative to stator.

With continued reference to FIG. 2, and in one or more embodiments, magnets 160 may be permanent magnets fixed to cylindrical portion 152. Magnets 160 may be arranged concentrically to a central axis A of rotor 148. Thus, magnets 160 may be arranged in a ring along the cylindrical portion 152. Magnets 160 may be arranged in a single ring or may be arranged in a plurality of rings along cylindrical portion 152. Each magnet 160 may be positioned adjacent to another magnet 160 along convex outer surface so that stator 112 is continuously interacting with a magnet to produce a rotation of rotor 148. In one or more embodiments, hub and cylindrical portion 152 may be made from various materials, such as, for example, steel or titanium. In an embodiment, rings and/or layers of rings of magnets 160 may be formed by using adhesive between each of the magnets 160. The adhesive may include epoxy which may be heat cure, UV cure, or the like. The ring of magnets may be formed by stacking layers of magnets on top of one another and using adhesive to adhere adjacent magnetic elements. The magnets may be rare earth magnets, including without limitation Neodymium magnets. Magnets 160 may be adhered to rotor 148 using adhesives as discussed above.

With continued reference to FIG. 2, and in one or more embodiments, magnets 160 may include a magnet array. In non-limiting embodiments, a magnet array may include a Halbach array. A Halbach array is a special arrangement of permanent magnets that augments the magnetic field on one side of the array while canceling the field to near zero on the other side of the array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

With continued reference to FIG. 2, and in one or more embodiments, hoop 228 may include cooling features, such as, for example, an integrated radial fan 232 or an integrated axial fan 168. A radial fan may comprise cooling fins positioned on an upper surface of hoop 228 and provide cooling to a stator when rotor 148 is rotating about central axis A. An axial fan may include fins positioned along an inner surface of hoop 228 and provide cooling to motor. Radial fan and/or axial fans may increase air flow in rotor 148 and cause convection cooling. Radial and axial fans may be consistent with motor cooling fans provided in the disclosure U.S. application Ser. No. 17/515,515 titled "AN ELECTRIC AIRCRAFT LIFT MOTOR WITH AIR COOLING", which is incorporated in this disclosure in its entirety. In one or more embodiments, hoop 228 may include various types of materials, such as for example, titanium, steel, and the like.

Continuing to reference FIG. 2, and in one or more embodiments, a retention band 226 surrounds magnets 160. Additional disclosure on retention bands and magnets are discussed in U.S. patent application Ser. No. 17/966,525, filed on Oct. 14, 2022, and entitled "ROTOR FOR AN ELECTRIC AIRCRAFT MOTOR AND A METHOD FOR MANUFACTURING". Retention band 226 may be present around the outer surface of magnets 160. The outer surface of magnets 160 may be the surface opposite the surface in contact with hoop 228. Retention band 226 may be a sleeve of a solid material or an aggregation of individual materials that run along the outer surface of magnets 160. Retention band 226 may be made from various materials, such as stainless steel, titanium, carbon, carbon-composite, and the like. Retention band 226 and magnets 160 may have the same or similar coefficients of thermal expansion. As a result, retention band 226 and/or magnets 160 may expand or shrink at similar rates, allowing for uniform stress around the magnets 160. A similar coefficient of thermal expansion may allow for no point forces to form between the retention band 226 and magnets 160. As used herein, a "retention band" is a component for maintaining a position of the component it is surrounding. For example, a retention band may be configured to maintain a position of magnets 160 by providing inward forces around the magnets 160. For example, retention band 226 may provide stability for rotor 148 and prevent magnets 160 from lifting from cylindrical portion 152 of hoop 228 due to centrifugal forces. Retention band 226 may include slits of various shapes and patterns to provide venting for temperature management purposes. For, example, slits 242 allow for air to pass through retention band 226, allowing air to circulate through rotor 148 when rotor 148 is spinning about central axis A.

Still referencing FIG. 2, retention band 226 may be configured to reduce eddy currents. As used herein, "eddy currents" are loops of electrical current induced by a changing magnetic field. In an embodiment, the rotating stator magnetic field may cause voltages in the stator and rotor. These voltages may cause small circulating currents to flow, which may be eddy currents. Eddy currents may serve no useful purpose in a motor and result in wasted power. A retention band 226 composed of a poor conductor, such as titanium, steel, plastics, rubber, and the like, may be used to reduce eddy currents. A poor conductor may be a material with a low conductivity. A low conductivity may be less than 3E6 S/m at 20° C. Additionally, the slits of retention band 226 may reduce eddy currents by breakup the area that the currents may circulate in.

With continued reference to FIG. 2, and in one or more embodiments, rotor 148 includes a plurality of spokes 144, that radiate from hub 208 to connect hub 208 and hoop 228. Spokes 144 may extend radially outward from hub 208 to hoop 228. Spokes 144 may be positioned in various arrangement to provide structural support to rotor 148. In one or more embodiments, spokes 144 may be made from various materials, such as steel, titanium and the like. In some embodiments, hoop 228 and spokes 144 may be separate components that may be assembly together. In other embodiments, hoop 228 and spokes 144 may be a monolithic structure. For example, in some cases spokes may include a single element, such as without limitation a disc. Disc may be solid or may include holes. In one or more embodiments, a distal end 244 of each spoke may terminate at and/or be attached to hoop 228, and a proximal end of each spoke 144 may be attached to hub 208.

Figure 3A:
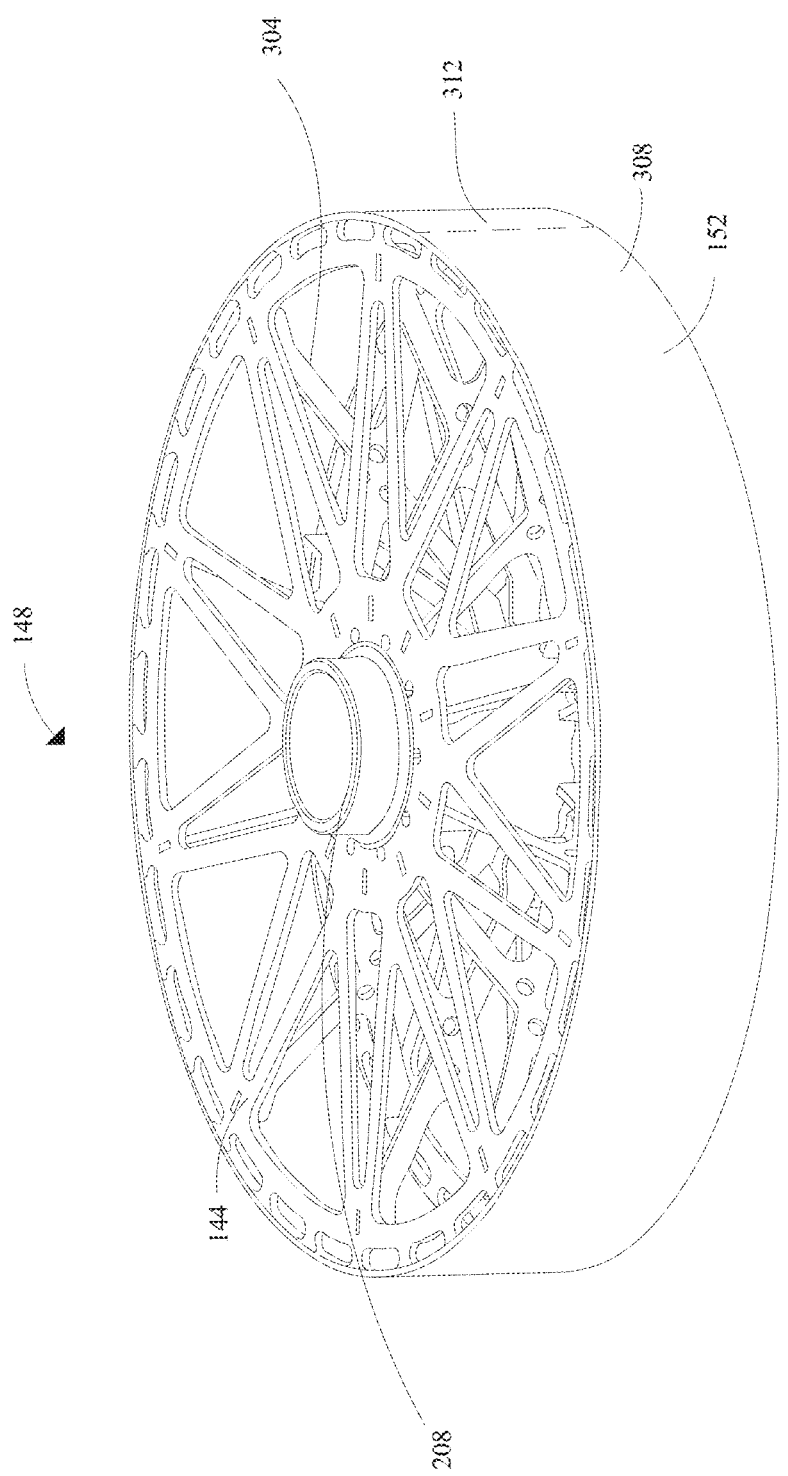
FIG. 3A is an illustration of an isometric view of a rotor.

Now referencing FIG. 3A, an isometric view of a rotor 148 is shown. Rotor 148 may include a cylindrical portion 152, spokes 144, a hub 208, and a stiffener 304. Stiffeners 304 may be described greater detail with reference to FIG. 3B. Cylindrical portion 152 may be made from sheet metal cut by flat stock shaping. For example, sheet metal may be cut using a flat stock shaping method, such as and without limitation, laser cutting, plasma cutting, water jet cutting, stamping, milling, machining, and the like. In an embodiment, cylindrical portion 152 may be formed using rectangular flat stock with a first length 308 of the rectangular flat stock circumscribing the cylindrical portion 152. In an embodiment, first length 308 may be the length of the circumference of the cylindrical portion 152. The rectangular flat stock may be welded together at a seam along a second length 312 of the cylindrical portion 152. Second length 312 may be the height of the cylindrical portion 152. Welding methods may include TIG welding, laser welding, MIG welding, and the like. The seam may be butt welded with a full thickness weld. Specifically, cylindrical portion 152 may be welded without overlap at second length 312. As used herein, a "full thickness weld" is a weld that has been beveled and penetrated by being filled with multiple weld passes. Cylindrical portion 152 may be composed of titanium. Spokes 144, hub 208, and/or stiffeners 304 may also be composed of titanium.

Still referencing FIG. 3A, rotor 148 may include spokes 144. Spokes 144 may be located at the top and bottom edges of cylindrical portion 152. In some embodiments, the plurality of spokes 144 may be a single element, as shown in FIG. 3A. For example, spokes 144 may be a monolithic structure. Spokes 144 may be formed through subtractive manufacturing. In an embodiment, water jet cutting, machining, milling, stamping, and the like may be used to form spokes 144. For example, a water jet, band saw, plasma cutter, and the like may be used to cut holes in a flat piece of stock metal to form the spokes 144. Then, the piece of stock metal may be machined to include flanges 316. Alternatively, or additionally, spokes may be cut from a flat piece of stock metal using a stamping process. A stamping process may remove material from a piece of stock metal. Then, a flange may be formed by bending the flat piece of stock metal. Water jetting may include using high pressure water and an abrasive material, such as sand, to cut through metal. Plasma cutting may include using electricity to cut through metal to create spokes. Saws such as a band saw may also be used to cut holes, such as triangular shaped holes, in metal to create spokes. Spokes 144 may also include a flange 316 (shown in FIG. 2), which may be created through machining methods, such as milling and/or lathing. Flange 316 may be used as a place to weld spokes 144 to cylindrical portion 152. Welding may be done using any welding method as discussed herein. In some embodiments, spokes 144 may radially connect hub 208 to cylindrical portion 152. In some embodiments, there may be 3, 4, 6, 8, or more sets of spokes. In some embodiments, spokes 144 may be arranged in a radially symmetric pattern. In some embodiments, each spoke in spokes 144 may include a single member connecting hub 208 to cylindrical portion 152. In some embodiments, each spoke of spokes 144 may include a triangular element (as depicted in FIG. 3A). Triangular element may be beneficial as it may add strength and rigidity to rotor 148. In some embodiments, spokes 144 may define a plurality of small apertures. The small apertures may have any suitable cross-sectional shape. The plurality of small apertures may serve to reduce the overall weight of the rotor 148 by reducing the amount of material contained in spokes 144. Plurality of small apertures may be arranged so as to preserve the structural integrity and load resistance of the rotor 148.

Figure 3B:
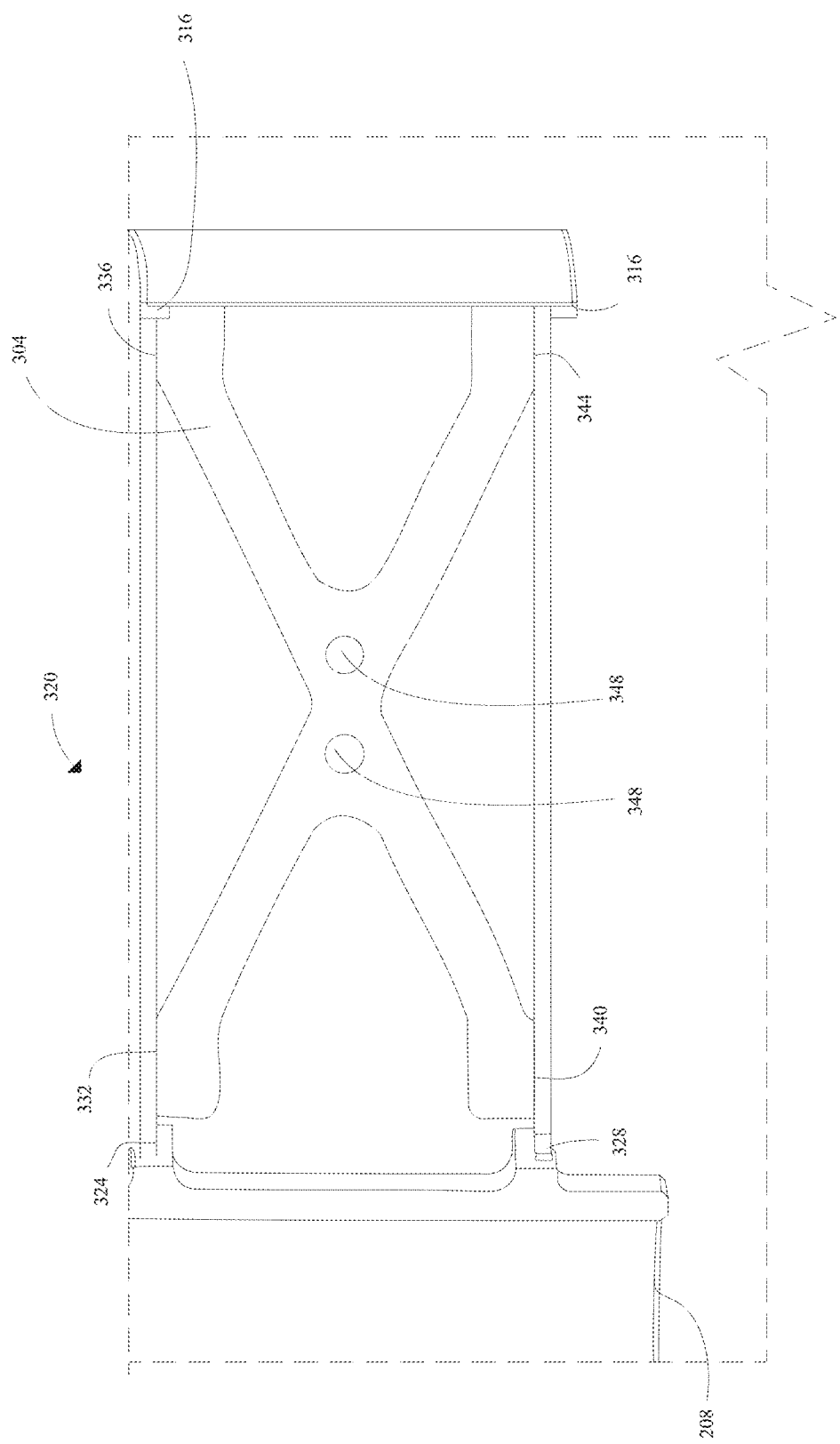
FIG. 3B is an illustration of a cross sectional view of a rotor.

Now referencing FIG. 3B, a cross sectional view 320 of a portion of a rotor 148 is shown. Flange 316 may be used as a location to join spokes 144 and cylindrical portion 152. Flange 316 may be welded to first length 308. Welding may include any welding methods as discussed above. Flange 316 may be welded to first length 308 using a flange weld. In an embodiment, there may be two flanges 316 on rotor 148. Each flange 316 may be welded to cylindrical portion 152. Additionally, hub 208 may be welded to spokes at points 324 and 328. In an embodiment, hub 208 may be weld such that there is a weld circumcising hub 208. This may be mirrored on the other side of rotor 148, which is not shown. Rotor 148 may also include stiffeners 304. Stiffeners 304 may be used to provide structure to rotor 148 by supporting the spokes 144. Stiffeners 304 may also be welded to spokes 144 at points 332, 336, 340, 344. Alternatively or additionally, stiffeners 304 may be mechanically connected to spokes, such as by way of screws, bolts, or the like. Alternatively or additionally, stiffeners 304 may be adhered to spokes 144 using an adhesive, such as epoxy, and the like. There may be a plurality of stiffeners 304 positioned around hub 208. Stiffeners may also be manufactured using a flat stock shaping method. Alternatively or additionally, stiffeners may be machined using a mill or a lathe. For example, stiffeners may be stamped from a piece of sheet metal. In another embodiment, stiffeners 304 may be milled from a piece of metal.

Still referencing FIG. 3B, alternatively or additionally, hub 208, spokes 144, stiffener 304, cylindrical portion 152, and the like may be manufactured using additive manufacturing. In an embodiment, additive manufacturing may be used as a cost saving method, as less material is wasted. Rather than removing material to create an end product, material is added when needed. Additive manufacturing may include metal additive manufacturing such as direct metal laser sintering, selective metal sintering, and the like.

With continued reference to FIG. 3B, in some embodiments, rotor 148 may include a plurality of holes 348. In some embodiments, stiffeners 304 may define holes 348. Holes 348 may have any suitable cross-sectional shape, such as, as non-limiting examples, circular, rectangular, hexagonal, and the like. In some embodiments holes 348 may be in portions of stiffeners 304 that have excess material. For the purposes of this disclosure, "excess material" is material that is not needed to meet a parts structural and load-bearing requirements. In some embodiments, holes 348 may serve to reduce the weight of stiffeners 304 and thus the overall weight of rotor 148. This may be the case because holes 348 decrease the amount of material in stiffeners 304. This may ultimately result in energy savings for the electric aircraft.

Figure 4:
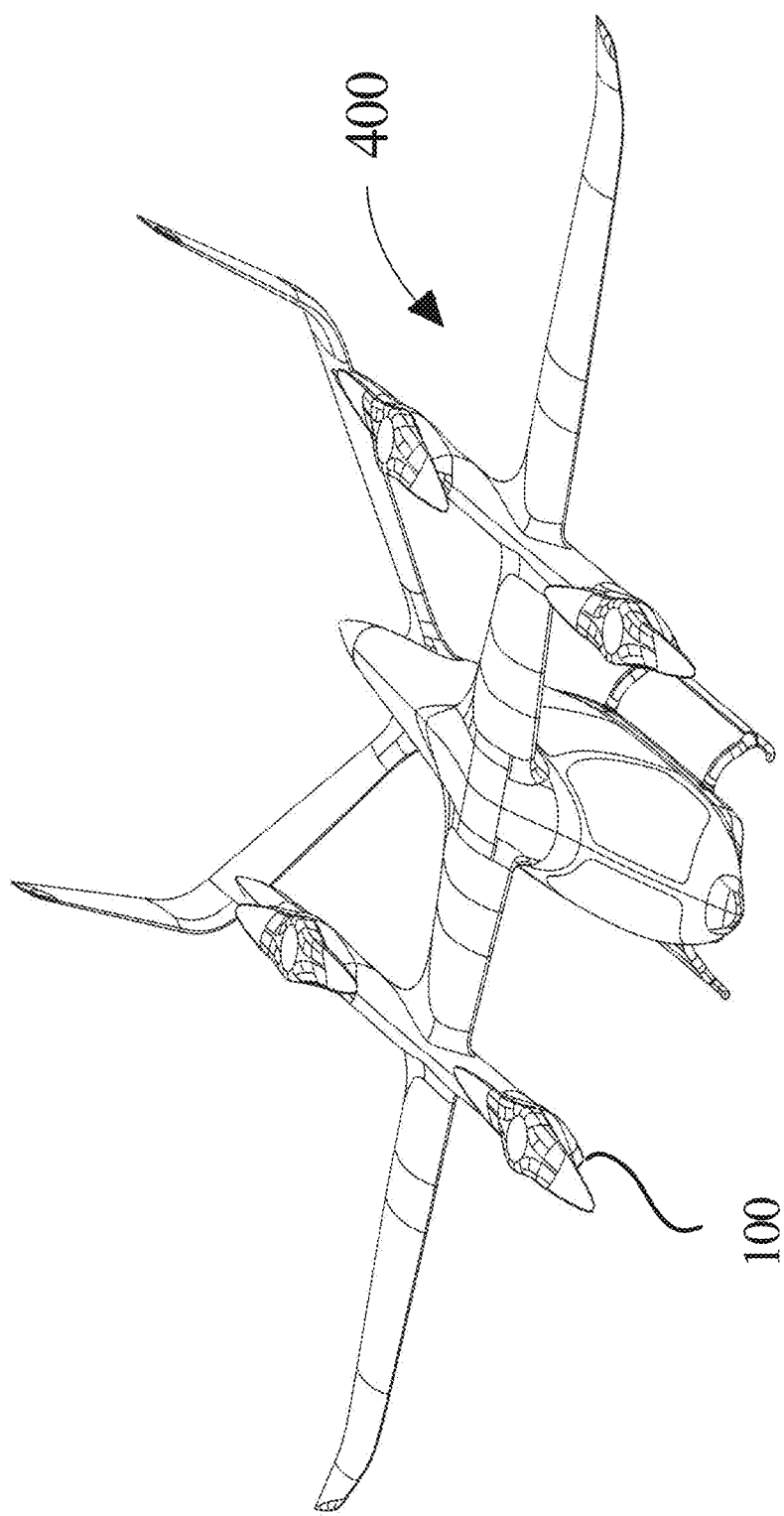
FIG. 4 is an embodiment of an electric aircraft.

Now referring to FIG. 4, an exemplary electric aircraft to include motor 100 is illustrated. Electric aircraft 400 may include motor 100 may be mounted on a structural feature of an aircraft. Design of motor 100 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 400. For example, and without limitation structural feature may be any portion of a vehicle incorporating motor 100, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by a propulsor, such as any propulsor as discussed herein. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor 100 may eliminate need for many external structural features that otherwise might be needed to join one component to another component. Motor 100 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Still referring to FIG. 4, electric aircraft 400 can include motor 100. Motor 100 may include a stator which has a first magnetic generating element generating a first magnetic field. Motor 100 may also include a propulsor with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

Still referring to FIG. 4, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 404 may include structural elements that physically support a shape and structure of an aircraft. Structural elements may take a plurality of forms, alone or in combination with other types. Structural elements may vary depending on a construction type of aircraft such as without limitation a fuselage 404. Fuselage 404 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 4, aircraft fuselage may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage orthogonal to a longitudinal (nose to tail) axis of the aircraft and may form a general shape of fuselage. A former may include differing cross-sectional shapes at differing locations along fuselage, as the former is the structural element that informs the overall shape of a fuselage curvature. In embodiments, aircraft skin may be anchored to formers and strings such that the outer mold line of a volume encapsulated by formers and stringers includes the same shape as aircraft 400 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 4, fuselage may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 4, fuselage may include a semi-monocoque construction. Semi-monocoque construction, as used herein, is a partial monocoque construction, wherein a monocoque construction is describe above detail. In semi-monocoque construction, aircraft fuselage may derive some structural support from stressed aircraft skin and some structural support from underlying frame structure made of structural elements. Formers or station frames can be seen running transverse to the long axis of fuselage 404 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 4, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 4, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 404. Monocoque includes only structural skin, and in that sense, aircraft skin undergoes stress by applied aerodynamic fluids imparted by the fluid. Stress as used in continuum mechanics may be described in pound-force per square inch (lbf/in2) or Pascals (Pa). In semi-monocoque construction stressed skin may bear part of aerodynamic loads and additionally may impart force on an underlying structure of stringers and formers.

Now referencing FIG. 5, a method 500 of manufacturing a fully welded rotor is shown. Step 505 of method 500 includes receiving a stator. The stator includes an inner cylindrical surface and an outer cylindrical surface, wherein each of the inner cylindrical surface and the outer cylindrical surface are coaxial about an axis of rotation. This step may be implemented without limitation as described in FIGS. 1-4.

Step 510 of method 500 includes receiving a rotor. A rotor may include a cylindrical portion. Cylindrical portion may include rectangular flat stock with a first length of the rectangular flat stock circumscribing the cylindrical portion. Rectangular flat stock may include sheet metal and the like. Rectangular flat stock may be welded together at a seam along a second length of the cylindrical portion. Welding may include butt welding, and the like. Cylindrical portion may be cut by flat stock shaping. This may include laser cutting, water jetting, plasma cutting, milling, machining, and the like. This step may be implemented without limitation as described in FIGS. 1-4.

Step 515 of method 500 includes receiving spokes. Receiving spokes may include using flat stock shaping to shape a circular flat stock into spokes. Additionally, machining methods such as milling, or lathing may be used to shape raw metal material into spokes. For example, raw metal material, such as flat stock, stock metal, and the like, may be machined to cut out triangular shapes. The remaining material may include spokes. This step may be implemented without limitation as described in FIGS. 1-4.

Step 520 of method 500 includes welding the cylindrical portion to the spokes. Welding may include arc welding, MIG welding, laser welding, and the like. Cylindrical portion and spokes may include titanium. This step may be implemented without limitation as described in FIGS. 1-4.

Method 500 may also include welding a hub to the spokes and welding a stiffener to the spokes and the cylindrical portion. The stiffener may be configured to provide structure to the rotor. Additionally, a plurality of magnets may be adhered to the rotor. Specifically, the magnets may be adhered to the cylindrical portion. The magnets may be configured to interact with the stator to provide a rotational speed. These steps may be implemented without limitation as described in FIGS. 1-4.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A motor with a welded rotor for an electric aircraft, the motor comprising:
   a stator connected to the electric aircraft, the stator comprising:
      an inner cylindrical surface and an outer cylindrical surface, wherein each of the inner cylindrical surface and the outer cylindrical surface are coaxial about an axis of rotation; and
   a rotor coaxial within the stator, the rotor comprising:
      a cylindrical portion;
      a plurality of stiffeners, wherein the stiffeners include a plurality of holes arranged in a predetermined configuration and located at excess material portions of the stiffeners; and
      a plurality of spokes welded to the cylindrical portion and at least a stiffener from the plurality of stiffeners.

2. The motor of claim 1, wherein the rotor further comprises a hub welded to the spokes.

3. The motor of claim 1, wherein the cylindrical portion comprises rectangular flat stock, wherein a first length of the rectangular flat stock makes up a portion of the circumference of the cylindrical portion.

4. The motor of claim 3, wherein the rectangular flat stock is welded at a seam along a second length of the cylindrical portion.

5. The motor of claim 3, wherein the weld is a butt weld.

6. The motor of claim 1, wherein the cylindrical portion is cut by flat stock shaping.

7. The motor of claim 1, wherein the cylindrical portion and the plurality of spokes comprises titanium.

8. The motor of claim 1, wherein a plurality of magnets is adhered to the rotor.

9. The motor of claim 8, wherein the plurality of magnets is configured to interact with the stator to provide a rotational speed in the rotor.

10. The motor of claim 1, wherein the plurality of holes are cross-sectional circular shaped.

11. A method of manufacturing a welded rotor, the method comprising:
    receiving a stator, the stator comprising:
       an inner cylindrical surface and an outer cylindrical surface, wherein each of the inner cylindrical surface and the outer cylindrical surface are coaxial about an axis of rotation;
    receiving a rotor comprising a cylindrical portion, wherein the rotor is coaxial within the stator;
    receiving a plurality of spokes;
    receiving a plurality of stiffeners, wherein the stiffeners include a plurality of holes arranged in a predetermined configuration and located at excess material portions of the stiffeners;
    welding the plurality of spokes to the cylindrical portion and to at least a stiffener from the plurality of stiffeners.

12. The method of claim 11, further comprising:
    receiving a hub; and
    welding the hub to the plurality of spokes.

13. The method of claim 11, wherein receiving the cylindrical portion further comprises receiving a rectangular flat stock wherein a first length of the rectangular flat stock makes up a portion of the circumference of the cylindrical portion.

14. The method of claim 13, further comprising welding the rectangular flat stock at a seam along a second length of the cylindrical portion.

15. The method of claim 14, wherein welding further comprises welding a butt weld.

16. The method of claim 11, further comprising cutting, by flat stock shaping, the cylindrical portion.

17. The method of claim 11, wherein the cylindrical portions and the plurality of spokes comprises titanium.

18. The method of claim 11, further comprising adhering a plurality of magnets to the rotor.

19. The method of claim 18, further comprising interacting with the stator, by the plurality of magnets, to provide a rotational speed.

20. The method of claim 11, wherein the plurality of holes are cross-sectional circular shaped.

* * * * *